United States Patent [19]

Kachuk

[11] Patent Number: 4,810,918
[45] Date of Patent: Mar. 7, 1989

[54] ROTOR SHAFT WITH CORROSION RESISTANT FERRULE FOR PUMPS MOTOR

[75] Inventor: Paul T. Kachuk, Fort Wayne, Ind.
[73] Assignee: Flint & Walling, Inc., Kendallville, Ind.
[21] Appl. No.: 106,111
[22] Filed: Oct. 7, 1987
[51] Int. Cl.⁴ .................. H02K 5/16; F01D 11/08
[52] U.S. Cl. ........................ 310/90; 310/87; 415/170 A
[58] Field of Search ............ 277/81 R; 310/42, 87, 310/88, 90; 384/130; 415/170 R, 170 A, 111

[56] References Cited

U.S. PATENT DOCUMENTS

| | | | |
|---|---|---|---|
| 1,249,572 | 12/1917 | Weitling | 415/170 A |
| 2,010,525 | 8/1935 | McHugh | 415/170 A |
| 2,190,670 | 2/1940 | Mann | 415/170 A |
| 2,862,453 | 12/1958 | Nagle | 415/170 A |
| 3,868,520 | 2/1975 | Curtis et al. | |
| 4,199,092 | 4/1980 | Rose | |
| 4,286,183 | 8/1981 | Montgomery | |
| 4,345,801 | 8/1982 | Randolph et al. | |
| 4,380,416 | 4/1983 | Menager | 415/170 A |
| 4,454,438 | 6/1984 | Yamashita et al. | |
| 4,473,335 | 9/1984 | Henry | |
| 4,644,210 | 2/1987 | Meisner et al. | |

FOREIGN PATENT DOCUMENTS

| | | | |
|---|---|---|---|
| 842309 | 7/1949 | Fed. Rep. of Germany | 415/170 A |
| 53-91497 | 2/1980 | Japan | 415/170 A |

Primary Examiner—Patrick R. Salce
Assistant Examiner—D. L. Rebsch
Attorney, Agent, or Firm—Edgar A. Zarins; Malcolm L. Sutherland

[57] ABSTRACT

A corrosion resistant ferrule secured to the end of a full carbon steel rotor shaft in order to reduce wear and corrosion of the sealing elements of the pump assembly, while enhancing the overall strength of the drive shaft. A threaded member is received in the end of the rotor shaft and ferrule in order to secure the pump impeller to the drive shaft. The corrosion resistant ferrule reduces manufacturing costs while allowing integral rotor shaft construction. The ferrule may be manufactured of stainless steel, plastic, or brass.

13 Claims, 2 Drawing Sheets

ROTOR SHAFT WITH CORROSION RESISTANT FERRULE FOR PUMPS MOTOR

BACKGROUND OF THE INVENTION

I. Field of the Invention

This invention relates to a rotor shaft construction for a fluid pump or the like and, in particular, to a shaft construction which utilizes a corrosion resistant ferrule mounted to the end of the carbon steel rotor shaft.

II. Description of the Prior Art

In a fluid pump assembly, rotational torque is transferred from the drive motor to the fluid impeller through a rotor shaft extending from the stator winding within the motor housing. Typically, the impeller is housed in a detachable pump housing for ease of repair or replacement of either the motor or the pump. For this reason a fluid seal must be provided to prevent leakage past the rotor shaft extending into the pump housing. Any sealing means may be utilized; however, typically a face seal, combining a carbon-based inner ring which rotates with the shaft and a ceramic outer ring which is stationary, are utilized in modern motor/pump assembles. Conventional rubber seals also provide an inexpensive method of sealing about the rotor shaft.

Because of the environment within which such pumps are utilized, corrosion between the carbon seal ring and the full carbon shafts utilized in past known pump motors is a prevalent problem. This corrosion of the carbon shaft can result in a loss of seal integrity, causing leakage past the shaft and possibly into the electric motor. In the case of a rubber seal the continuous rotational motion of the shaft against the seal can cause the seal to become worn, resulting in leakage. Wear on the seal is particularly prevalent when a full carbon steel shaft is utilized. In order to reduce corrosion of the shaft and wear on the sealing means, the extrinsic end of the shaft has been formed of stainless steel polished to reduce friction. Typically, the stainless steel rod is inertia welded to the carbon steel shaft. However, other means, such as a threaded engagement, have been utilized to attach the stainless portion of the shaft. Although a full stainless steel rotor shaft is possible, the cost of such an arrangement make it prohibitive. Thus, the carbon steel main shaft with the stainless steel end portion provides the necessary strength while reducing wear on the sealing elements in contact with the shaft. Still, shaft constructions which further reduce production costs are continuously sought.

SUMMARY OF THE PRESENT INVENTION

The present invention overcomes the disadvantages of the prior known rotor shaft constructions by providing a construction which has sufficient strength and integrity to eliminate breakage, but also reduce corrosion between the shaft and seal, and wear on the sealing elements in contact with the shaft of the motor.

The rotor shaft construction according to the present invention generally comprises a corrosion resistant ferrule secured to the end of a full carbon rotor shaft. The carbon shaft and the ferrule include reduced end openings adapted to receive a threaded element utilized to mount the impeller of the pump to the shaft of the drive motor. The extrinsic end of the carbon shaft has a reduced diameter in order to receive the corrosion resistant ferrule. Corrosion resistant materials such as stainless steel, plastics, or brass may be utilized in the manufacture of the ferrule. Thus, manufacturing costs are reduced by minimizing the amount of stainless steel material or the like utilized in the shaft and eliminating the necessity to attach two rod portions. Moreover, the integrity of the shaft is substantially uninterrupted reducing rotor shaft failures. However, the sealing elements of the pump engage only the corrosion resistant portion of the shaft thereby reducing wear and corrosion thereof.

Other objects, features, and advantages of the invention, will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
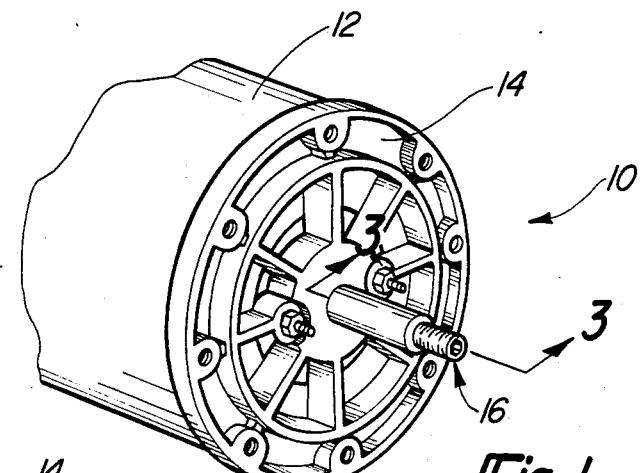
FIG. 1 is an elevated perspective of a motor housing assembly with one end of the rotor shaft of the present invention extending therefrom.

Referring first to FIG. 1, there is shown a motor assembly 10 adapted to be drivably connected to a fluid pump assembly 11. The motor assembly 10 generally comprises a motor housing 12 within which are disposed the stator windings of the motor and an end mounting plate 14 to facilitate connection of the motor assembly 10 to the pump assembly. The motor assembly 10 also includes a rotor shaft 16 embodying the present invention. The rotor shaft 16 is driven by the internal stator windings and extends through the motor assembly 10 out through the end plate 14 to be drivably connected to the pump assembly.

Figure 2:
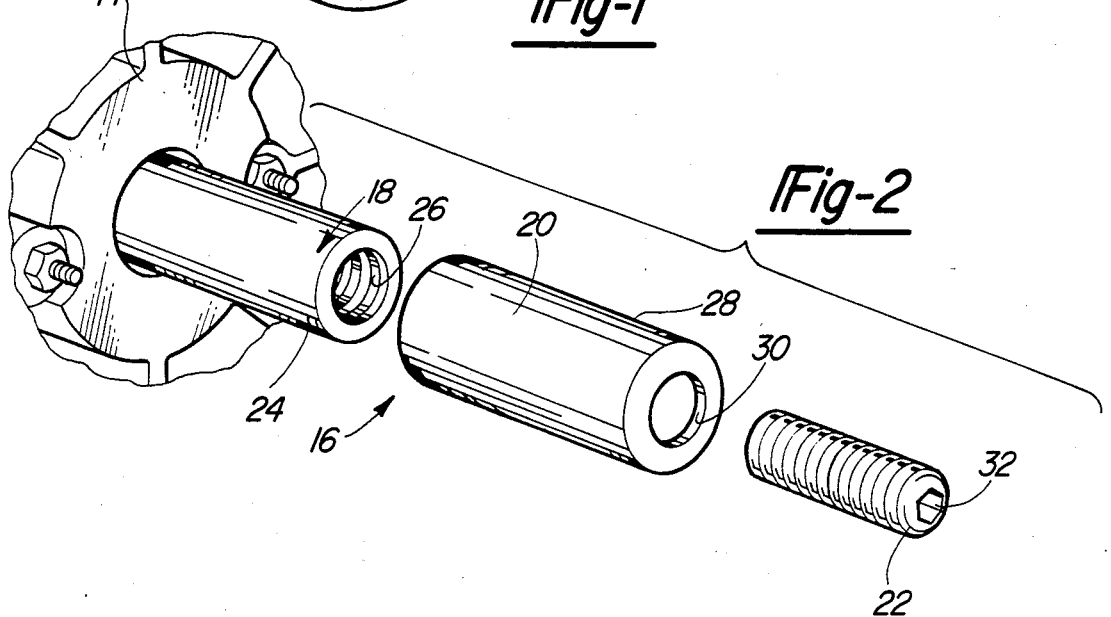
FIG. 2 is an exploded view of the rotor shaft construction embodying the present invention.
Figure 3:
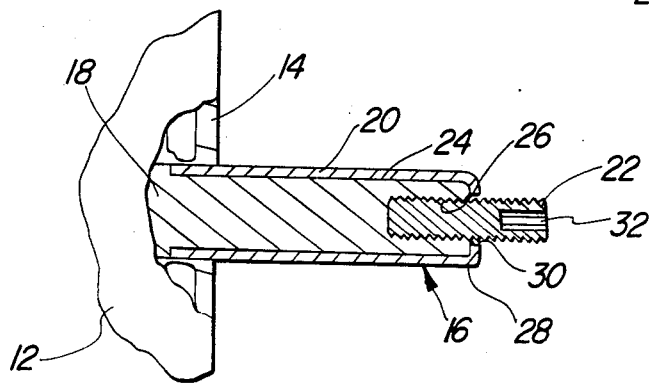
FIG. 3 is a cross-sectional perspective of the rotor shaft construction embodying the present invention taken along line 3—3 of FIG. 1.

As best shown in FIGS. 2 and 3, the rotor shaft construction 16 of the present invention comprises a carbon steel main rotor shaft 18, a corrosion resistant ferrule 20 which fits over the end of the main shaft 18, and a corrosion resistant threaded member 22 which is received in the end of both the rotor shaft 18 and ferrule 20. The rotor shaft 18 includes a reduced diameter end portion 24 which extends outwardly of the motor housing 12 and is adapted to snugly receive the ferrule 20. In this manner, upon attachment of the ferrule 20, the rotor shaft will have a substantially uniform diameter. The rotor shaft 18 including the reduced diameter portion 24 is made of a carbon steel to provide the shaft with sufficient structural strength. Formed in the end of the rotor shaft 18 is a threaded partial axial bore 26.

In the preferred embodiment of the present invention, the ferrule 20 is made of a stainless steel material polished in order to provide a smooth engaging surface. Alternatively, the ferrule 20 may be made of a plastic material, which would significantly reduce the cost of manufacture and the weight of the motor, or of polished brass. However, any corrosion resistant material may be utilized to manufacture the ferrule 20 since the structural strength of the shaft 16 is maintained by the underlying carbon shaft. The ferrule 20 has a smooth outer surface 28 in order to reduce wear on the seal means within the pump assembly with which it cooperates during operation. The end of the ferrule 20 includes an aperture 30 which aligns with the partial axial bore 26 of the shaft 18. In general, the ferrule 20 has a tubular configuration adapted to removably slip over the reduced diameter end portion 24 of the shaft 18.

The threaded member 22 includes standard threads extending the full length thereof and is adapted to be received through the end aperture 30 of the ferrule 20 and within the threaded partial bore 26 of the shaft 18 as shown in FIG. 3. The member 22 is fully threaded such that a portion of it can extend into the bore 26 while the remainder can be utilized to drivably connect the shaft 18 to the pump impeller of the pump assembly. The outer end of the threaded member 22 is provided with a hexagonal cavity 32 adapted to receive a tool such as an allen wrench to facilitate rotation of the threaded member 22 into the partial bore 26.

Figure 4:
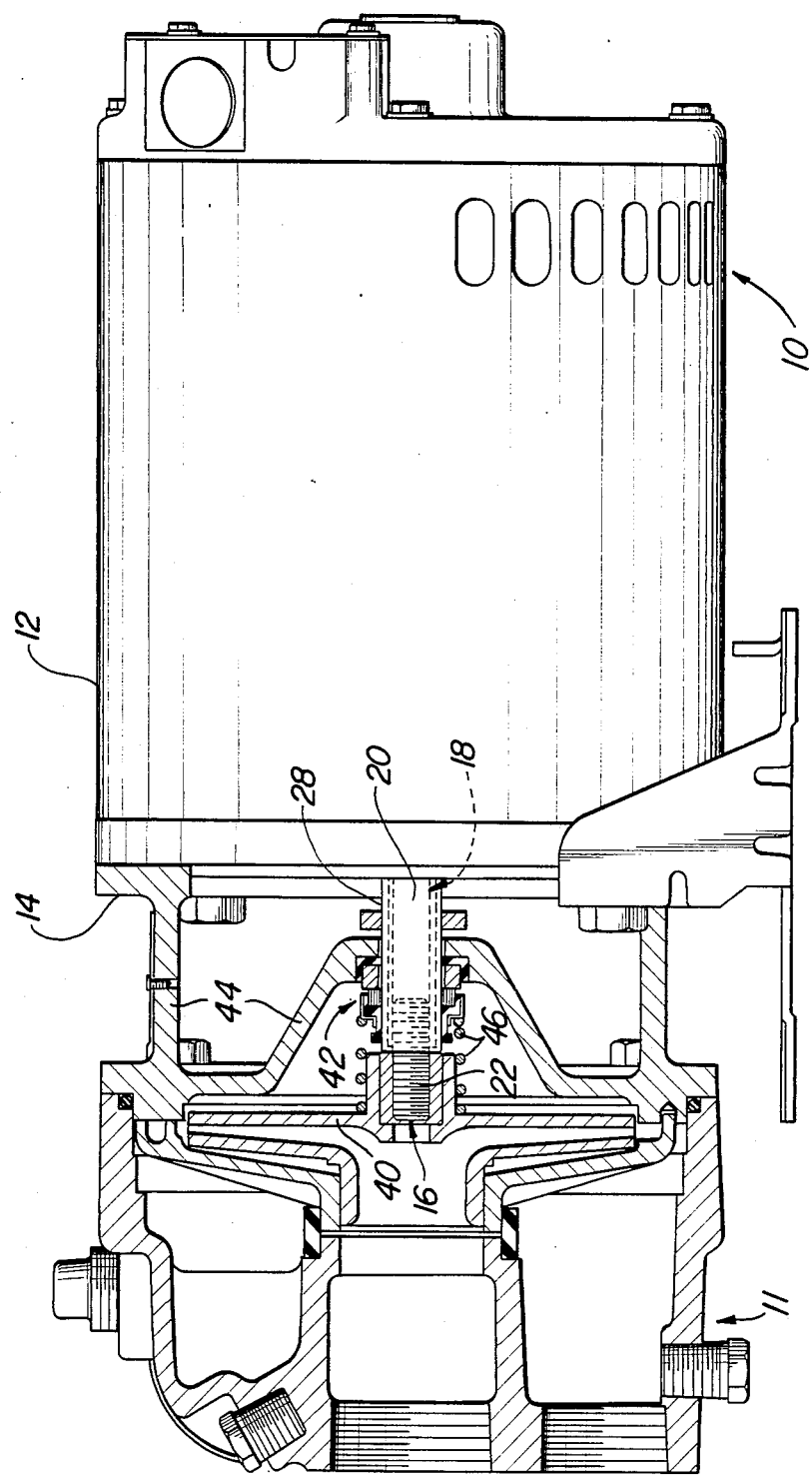

Referring now to FIG. 4, the motor assembly 10 is shown connected to the pump assembly 11 with the rotor shaft 16 extending from the motor 10 to engage an impeller 40 of the pump 11. The impeller 40 threadably engages the threaded member 22 such that the rotational torque of the motor 10 and shaft 16 are imparted to the impeller 40. A seal assembly 42 is mounted on the ferrule 20 of the shaft 16 in association with the pump housing wall or an intermediate bracket 44 in order to fluidly isolate the pump impeller 40 from the motor 10. The seal assembly 42 is biased from the impeller 40 by a spring 46. The seal assembly 42 remains stationary as the shaft 10 and impeller 40 rotate. As a result, the polish-smooth surface 28 of the ferrule 20 will engage the seal assembly 42 as the shaft 16 and impeller 40 rotate.

Thus, the present invention provides a convenient and inexpensive means of reducing corrosion and wear of the rotor shaft 16 by providing a smooth, corrosion resistant shaft portion while also maintaining the structural strength of a full carbon steel rotor shaft. Moreover, material costs are reduced by providing only a stainless steel or plastic outer surface. In addition, despite the reduced wear, the ferrule will become worn and rough after prolonged use. With the present construction, the ferrule can be removed and replaced.

The foregoing detailed description has been given for clearness of understanding only and no unnecessary limitations should be understood therefrom as some modifications will be obvious to those skilled in the art without departing from the scope and spirit of the appended claims.

I claim:

1. A rotor shaft construction for a motor and pump assembly having a rotor shaft extending therethrough and drivably connected to an internal stator winding, said rotor shaft construction comprising:
    a ferrule made of a corrosion resistant material attached to a reduced diameter portion of said rotor shaft such that said rotor shaft has a substantially uniform diameter, said ferrule including an end wall abutting the end of said rotor shaft as said shaft is matingly received within said ferrule; and
    means for drivably connecting said rotor shaft to the pump assembly.

2. The rotor shaft construction as defined in claim 1 wherein said ferrule includes an aperture formed in said end wall and said rotor shaft includes a partial axial bore formed in the end of said rotor shaft, said end aperture axially aligning with said partial axial bore of said rotor shaft, said connecting means extending through said aperture into said partial bore.

3. The rotor shaft construction as defined in claim 2 wherein said connecting means comprises a threaded member received in said partial axial bore through said ferrule aperture.

4. The rotor shaft construction as defined in claim 3 wherein said rotor shaft is made of a carbon steel and wherein said ferrule attaches to an end of said rotor shaft extending from the motor assembly, said ferrule covering substantially the entire length of rotor shaft extending from the motor assembly.

5. The rotor shaft construction as defined in claim 4 wherein said ferrule is made of stainless steel.

6. The rotor shaft construction as defined in claim 4 wherein said ferrule is made of a plastic material.

7. A rotor shaft construction for a motor and pump assembly having a rotor shaft extending therethrough and drivably connected to an internal stator winding, said rotor shaft construction comprising:
    a ferrule made of a corrosion resistant material attached to a reduced diameter portion of said motor shaft such that said rotor shaft has a substantially uniform diameter, said ferrule including a sleeve portion and an end wall portion, the end of said motor shaft abutting said end wall portion of said ferrule as said shaft is matingly received within said ferrule; and
    means for drivably connecting said rotor shaft construction to the pump assembly, said means comprising a threaded member threadably received within a partial axial bore formed in the end of said rotor shaft and through an end aperture formed in said end wall portion of said ferrule and axially aligned with said partial bore.

8. The rotor shaft construction as defined in claim 7 wherein said rotor shaft is made of a carbon steel for structural strength and said ferrule is made of a polished stainless steel whereby the entire extrinsic end of said motor shaft is provided with a stainless steel surface.

9. The rotor shaft construction as defined in claim 7 wherein said rotor shaft is made of a carbon steel for structural strength and said ferrule is made of a plastic material whereby the entire extrinsic end of said motor shaft is provided with a plastic surface.

10. The rotor shaft construction as defined in claim 7 wherein said ferrule is substantially the length of the extrinsic end of said rotor shaft, said ferrule adapted to engage seal means of the pump assembly.

11. In a motor and pump assembly having a rotor shaft extending therethrough from a stator winding in the motor assembly, the extrinsic end of the rotor shaft drivably connected to the pump assembly, an improved rotor shaft construction comprising:
    a stainless steel ferrule attached to a reduced diameter end portion of the rotor shaft such that the rotor shaft has a substantially uniform diameter, said ferrule including a sleeve portion and an end wall portion having an end aperture, said end wall portion of said ferrule abutting the end of the rotor shaft to align said end aperture with a partial axial bore formed in the rotor shaft, the partial axial bore and end aperture receiving a threaded member for drivably connecting the rotor shaft construction to the pump assembly.

12. The rotor shaft construction as defined in claim 11 wherein said stainless steel ferrule is polished to reduce frictional wear between the rotor shaft and seal means in the pump assembly.

13. A rotor shaft construction for a motor and pump assembly having a rotor shaft extending therethrough and drivably connected to an internal stator winding, said rotor shaft construction comprising:

a plastic ferrule attached to a reduced diameter portion of said rotor shaft such that said rotor shaft has a substantially uniform diameter, said rotor shaft being made of a carbon steel; and means for drivably connecting said rotor shaft construction to the pump assembly, said means comprising a threaded member received within a partial axial bore of said rotor shaft and through an end aperture of said ferrule aligned with said axial bore.

* * * * *